INVENTORS
ROBERT L. JACOBSON
BURWELL SPURLOCK

United States Patent Office 3,449,237
Patented June 10, 1969

3,449,237
STARTUP PROCEDURE FOR A PLATINUM-RHENIUM CATALYST REFORMING PROCESS
Robert L. Jacobson, Pinole, and Burwell Spurlock, Lafayette, Calif., assignors to Chevron Research Company, San Francisco, Calif., a corporation of Delaware
Filed Sept. 28, 1967, Ser. No. 671,329
Int. Cl. C10g 35/08
U.S. Cl. 208—138                          3 Claims

ABSTRACT OF THE DISCLOSURE

A reforming process using a catalyst containing platinum and rhenium on a porous solid carrier is started up by contacting the naphtha with the catalyst in the presence of an inert gas, for example, nitrogen The pressure in the reforming zone should be about 200 p.s.i.g. and the catalyst temperature about 650° F., when the naphtha is first contacted with the catalyst at a space velocity of about 1 v./v./hr. Thereafter, the catalyst temperature is increased to about 900° F. over a 2–3 hour period while building up autogenous pressure of produced hydrogen.

BACKGROUND

Field

The present invention relates to hydrocarbon reforming processes and more particularly to a method for starting up a reforming process conducted in the presence of a catalyst comprising platinum and rhenium associated with a porous solid catalyst carrier.

Prior art

Catalysts comprising catalytically active amounts of platinum and rhenium supported on porous solid carriers, for example, alumina, are highly active for reforming of naphtha fractions. The catalysts possess good selectivity, that is, are able to produce high yields of high octatne number gasoline products, throughout the reforming process. Furthermore, platinum-rhenium catalysts possess exceptionally high stability which permits the activity and selectivity characteristics of the catalysts to be retained during prolonged periods of reforming. However, the catalysts initially possess high demethanation activity, i.e., the catalysts cause excessive hydrocracking, when initially contacted with hydrogen and sulfur-free naphtha at reforming conditions; thus, large yields of hydrocarbon gases, for example, methane and ethane, are produced during the early stages of reforming. During this initial reforming period the selectivity of the catalysts for the production of high octane gasoline is accordingly low. In fact, the hydrocracking or demethanation activity of the platinum-rhenium catalysts is so high during the initial periods of reforming that the catalysts appear unacceptable for reforming. After an initial period of reforming, e.g., after several hundred hours, the demethanation activity of the catalysts decreases to an acceptable level, i.e., to a level at least equivalent to that of platinum catalysts without rhenium. Thereafter the performance, particularly the stability, of the platinum-rhenium catalysts for production of high grade gasoline is far superior to catalysts comprising platinum without rhenium; the initial poor reforming which results in the production of light gases such as methane can thus be tolerated, if necessary, for the period of time needed to reduce the excessive demethanation activity of the catalysts.

As a consequence of the high demethanation activity of platinum-rhenium catalysts, a severe temperature excursion, or heat front, travels through the catalyst bed when naphtha is initially contacted with platinum-rhenium catalysts in the presence of hydrogen and at reforming conditions. Although the temperature excursion only exists during the initial period of contact with the naphtha feed, such an excursion could be the cause of a temperature runaway in a commercial reforming plant. The temperature in the bed may increase as high as several hundred degrees above the temperature of the naphtha introduced to the reaction zone. Obviously, such a severe temperature increase can damage the reactor and/or catalysts.

SUMMARY

It has been found that the high temperature excursion normally observed when a sulfur-free naphtha and hydrogen are initially contacted with a catalyst comprising catalytically active amounts of platinum and rhenium associated with a porous solid carrier can be decreased or substantially eliminated by contacting the catalsyt in a reduced condition with a sulfur-free naphtha at reforming conditions and in the presence of an inert gas in accordance with the present invention. Thus, the present process for startup of a reforming process conducted in the presence of a reduced platinum-rhenium catalyst comprises introducing the catalyst into a treating zone, pressuring the treating zone with an inert gas, preferably nitrogen, to about 200 p.s.i.g., heating the catalyst to about 650° F., and contacting the catalyst with a substantially sulfur-free naphtha at a space rate of about one volume of naphtha per volume of catalyst per hour (1 v./v./hr.). A naphtha-inert gas mixture withdrawn from the treating zone is passed into a gas separation zone to separate inert gas from the naphtha, and the separated inert gas is recycled to the treating zone. Over a period of two to three hours, the temperature of the catalyst in the treating zone is raised at a generally uniform rate from about 650° F. to about 900° F. and the naphtha feed rate to the treating zone is gradually increased at a generally uniform rate from a space velocity of 1 v./v./hr. to a space velocity of at least 2 v./v./hr. The inert gas flow into the treating zone is gradually decreased over the period of 2 to 3 hours while building up autogenous pressure of produced hydrogen, e.g., by dehydrogenation of naphthenes.

Figure 2:
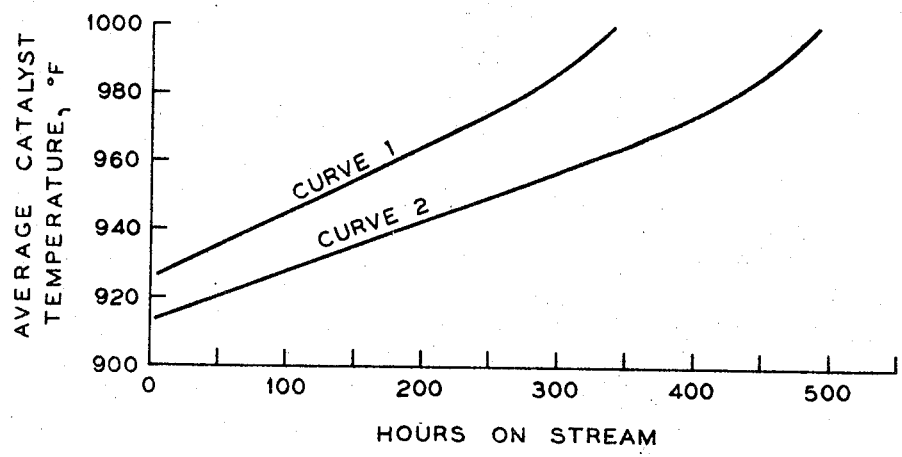
Figure 3:
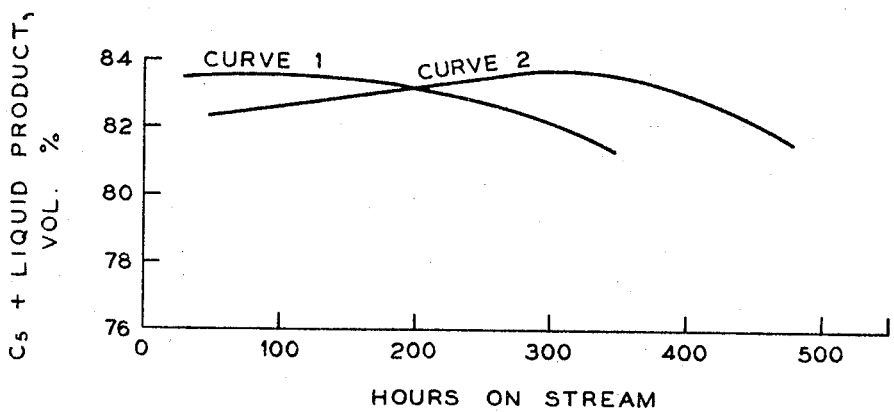

The graphs in FIGURES 2 and 3 show for comparison purposes a reforming process started up by presulfiding the catalyst and a process started up in accordance with the present invention using nitrogen as the inert gas. The graph in FIGURE 2 shows the average catalyst temperature required to maintain a 100 F–1 clear octane product as a function of hours on stream for a reforming process using presulfiding of the catalyst in startup (curve 1) and for a reforming process using the startup procedure of the present invention (curve 2). The graph in FIGURE 3 shows, as a function of time on stream, the yield of $C_5+$ liquid product or gasoline having a 100 octane (F–1 clear) rating produced during a reforming process using presulfiding of the catalyst in startup (curve 1) and for a reforming process using the startup procedure of the present invention (curve 2). The presulfiding procedure was used for comparison purposes since such startup procedures are generally considered conventional for reforming processes, particularly for reforming processes using platinum catalysts. (See, for example, U.S. Patents 2,863,825 and 3,224,962.)

DESCRIPTION OF THE INVENTION

The catalyst for use in the present invention comprises a porous solid catalyst carrier or support having deposited thereon in intimate admixture catalytically active amounts of platinum and rhenium. The catalyst preferably comprises platinum in an amount from about 0.01 to 3 weight percent and more preferably about 0.2 to 1 weight percent, based on the finished catalyst. Concentrations of platinum above about 3 weight percent can be used but are generally unsatisfactory because of the excessive cost of platinum and the high cracking which occurs. Concentrations of platinum below 0.01 weight percent are too low to contribute satisfactorily to reforming. The concentration of rhenium in the finished catalyst composition is preferably from 0.01 to 5 weight percent and more preferably from 0.1 to 2 weight percent. Higher concentrations of rhenium could be used; but the cost of rhenium limits the amount incorporated on the catalyst. It is preferred that the atom ratio of rhenium to platinum be from about 0.2 to about 2, more preferably, it is preferred that the atom ratio of rhenium to platinum does not exceed 1. Higher ratios, that is, greater than 1, of rhenium to platinum can be used but generally no further significant improvement is obtained.

Platinum and rhenium can be associated with the porous solid carrier by suitable techniques, such as, for example, impregnation, ion exchange, coprecipitation, etc. Furthermore, one of the metals can be associated with the carrier by one procedure, for example, by ion exchange and the other metal associated with the carrier by another procedure, for example, impregnation. The metals are preferably associated with the porous solid carrier by impregnation. The catalyst can be prepared either by coimpregnation of the two metals or by sequential impregnation. In general the carrier is impregnated with an aqueous solution of a decomposable compound of the metal in sufficient concentration to provide the desired quantity of metal in the finished catalyst; the resulting mixture is then heated to remove water. Suitable platinum sources for incorporation with the carrier include ammonium chloroplatinates, polyammineplatinum salts, etc. Chloroplatinic acid is generally the preferred source of platinum. Rhenium compounds suitable for incorporation onto the carrier include, among others, perrhenic acid and ammonium perrhenates.

It is contemplated in the present invention that the platinum and rhenium can be incorporated with the carrier at any particular stage of the catalyst preparation. Thus, for example, if the metals are to be incorporated onto an alumina support, the incorporation can take place while the alumina is in the form of a sol or a gel followed by precipitation of the alumina. Alternatively, a previously prepared alumina carrier can be impregnated with a water solution of the metal compounds. However, regardless of the method of preparation of the supported platinum-rhenium catalyst, it is desired that the platinum and rhenium exist in intimate admixture with each other on the porous solid carrier. Furthermore, the platinum and rhenium can be intimately dispersed throughout the porous solid carrier, if desired.

The porous solid carrier or support employed in the preparation of the platinum and rhenium catalyst can include a large number of materials upon which the catalytically active amounts of platinum and rhenium can be disposed. The porous solid carrier can be, for example, silicon carbide, charcoal, or carbon. Preferably, the porous solid carrier is an inorganic oxide. A high surface area inorganic oxide carrier is particularly preferred, e.g., an inorganic oxide having a surface area of 50–700 m.$^2$/gm. and more preferably 150–700 m.$^2$/gm. The carrier can be a natural or synthetically produced inorganic oxide or combination of inorganic oxides. Typical acidic inorganic oxide supports which can be used are the naturally occurring aluminum silicates, particularly when acid treated to increase the activity, and the synthetically-produced cracking supports, such as silica-alumina, silica-zirconia, silica-alumina-zirconia, silica-magnesia, silica-alumina-magnesia and crystalline zeolitic aluminosilicate. Generally, however, reforming processes are preferably conducted in the presence of a catalyst having low cracking activity, i.e., a catalyst of limited acidity. Hence, preferred carriers are inorganic oxides such as magnesia and alumina.

For purposes of the present invention alumina is a particularly preferred catalytic carrier. Any of the forms of alumina suitable as a support for reforming catalysts can be used. Furthermore, preparation of alumina by a variety of methods is satisfactory for purposes of this invention. The procedures for preparing alumina for use in reforming catalysts are well known in the prior art.

Following incorporation of the carrier material with platinum and rhenium, the resulting composite is usually dried by heating at a temperature of, for example, no greater than about 500° F., preferably about 200° F. to 400° F. Thereafter the composite can be calcined at an elevated temperature, for example, up to about 1200° F., if desired.

The catalyst can be promoted for reforming by the addition of halides, particularly fluoride or chloride. The halides apparently provide a limited amount of acidity to the catalyst which is beneficial to most reforming operations. Generally the halide content is preferably from about 0.1 to 3 weight percent based on the total catalyst composition. The halides can be incorporated onto the catalyst carrier at any suitable stage of catalyst manufacture, for example, prior to or following incorporation of the platinum and rhenium. Some halide is often incorporated onto the carrier when impregnating with the platinum; for example, impregnation with chloroplatinic acid normally results in chloride addition to the carrier. Additional halide may be incorporated onto the support simultaneously with, or following incorporation of the metal, if desired. In general, the halides are combined with the carrier by contacting suitable compounds such as hydrogen fluoride, ammonium fluoride, hydrogen chloride or ammonium chloride, either in the gaseous form or in a water soluble form, with the carrier. Preferably, the fluoride or chloride is incorporated onto the carrier from an aqueous solution containing the halide.

The present process for bringing a platinum-rhenium catalyst on stream is applicable with freshly prepared catalyst as well as with used catalyst which has been subsequently regenerated, e.g., by heating in an oxygen atmosphere. It is, however, essential for purposes of the present invention that the catalyst exist in a reduced sate prior to contact with the naphtha in the presence of the inert gas. The catalyst comprising platinum rhenium can be reduced, that is, the metals reduced, by heating at an elevated temperature in a reducing atmosphere free of hydrocarbons. The reduction is preferably performed in the presence of hydrogen and more preferably dry hydrogen. The metals are preferably reduced to the metallic state. The reduction can be accomplished at a temperature in the range of, for example, 600° F. to 1300° F. and preferably 600° F. to 1000° F. If the catalyst is not reduced, for example, in hydrogen, prior to contact with the naphtha and inert gas, then the hydrocarbons in the naphtha will act as the reducing agent. Reduction of the platinum-rhenium catalyst by means of hydrocarbons results in a catalyst having low activity and poor stability as compared to a catalyst reduced in a hydrogen atmosphere.

In accordance with the present invention a reforming reactor containing a reduced catalyst comprising platinum and rhenium supported on a porous solid carrier is pressured to about 200 p.s.i.g. with inert gas. The inert gas should be essentially free of hydrogen or other reactive gases, for example, oxygen. Thus the reactor should be pressured with a gas which is at least 95 volume percent inert. An inert gas for use in the present process is one which has little or no effect upon the reforming operation; that is, it does not react with the hydrocarbon oil or poison the catalyst to the extent that its use is undesirable. Inert gases which can be used for this purpose include, for example, nitrogen, argon, methane, flue gas resulting from the combustion of carbonaceous material with oxygen containing gas, etc. Nitrogen is preferably used as the inert gas in the present process.

The platinum-rhenium catalyst in the reactor is heated to about 650° F. Generally, the catalyst is heated to an elevated temperature during the time that the reactor is being pressured with an inert gas. However, it is contemplated as part of the present invention that the pressuring of the reactor and the heating of the catalyst need not occur simultaneously. That is, the reactor can be brought to a pressure of about 200 p.s.i.g., and then the catalyst brought up to the desired temperature. The inert gas is generally used as the medium to heat the catalyst to a temperature of about 650° F.; that is, the inert gas is heated to an elevated temperature prior to introduction into the reactor. The transfer of heat from the inert gas to the catalyst bed raises the temperature of the catalyst. Other conventional means of heating the catalyst bed can be used if desired, e.g., radiant heating. The inert gas removed from the outlet of the reactor is recycled to the inlet of the reactor. Recycled gas can be further heated for contact with the catalyst.

After a pressure in the reactor of about 200 p.s.i.g. and a catalyst temperature of about 650° F. are reached, a substantially sulfur-free naphtha is contacted with the catalyst at a liquid hourly space velocity (LHSV) of about 1 (1 volume of naphtha per volume of catalyst per hour). The naphtha feed is initially introduced into the reactor in contact with the catalyst at a low space velocity, i.e., a space velocity of about 1 v./v./hr., in order to maintain a high inert gas to feed ratio. A high inert gas to feed ratio is essential during the initial period of contact of the naphtha with the catalyst since the inert gas helps dissipate heat which is produced by hydrocracking or other exothermic reactions. Dissipation of the heat helps prevent further, uncontrollable hydrocracking, which could lead to a temperature runaway. Inert gas and naphtha are withdrawn from the reactor and from contact with the catalyst and are passed to a gas separation zone to separate naphtha from the inert gas. The inert gas is then recycled to the reactor.

Introducing the naphtha into contact with the catalyst when the temperature of the catalyst is about 650° F. and the pressure in the reactor is about 200 p.s.i.g. permits limited reforming of the naphtha, particularly dehydrogenation of naphthenes, while minimizing hydrocracking. Thus endothermic reactions are favored, while exothermic, or heat producing reactions, are minimized. A catalyst temperature higher than about 650° F. at which to introduce the naphtha into the reactor is undesirable since the extent of hydrocracking increases with increase in temperature. On the other hand, contacting the naphtha with the catalyst at a temperature significantly below 650° F. is not desired. At low temperatures, i.e., substantially below 650° F., practically no reforming of the naphtha occurs; a limited amount of reforming, particularly dehydrogenation of naphthenes, to produce hydrogen is essential. Thus, the catalyst temperature at which to introduce the feed must be high enough to permit sufficient dehydrogenation of naphthenes to produce hydrogen but not so high as to subject the naphtha feed to excessive hydrocracking or to reactions which are adversely influenced in the absence of hydrogen or in the presence of only small quantities thereof. Thus, for purposes of the present process, a catalyst temperature of about 650° F., i.e., a temperature within ±20° of 650° F., permits the desired limited dehydrogenation to occur without adverse reactions, e.g., hydrocracking.

The pressure in the reactor is maintained at about 200 p.s.i.g., i.e., within ±20 pounds of 200 p.s.i.g. when the naphtha is initially contacted with the catalyst. Increasing the pressure above 200 p.s.i.g. while holding the temperature at about 650° F. severely limits the extent of reforming, particularly dehydrogenation.

After contacting the naphtha with the catalyst at the low space rate of 1 v./v./hr., the temperature of the catalyst in the reactor is raised from about 650° F. to about 900° F. (i.e., within ±20° F. of 900° F.) at a generally uniform rate over a period of 2 to 3 hours. The temperature is increased to bring the reaction zone to normal reforming reaction temperatures. At the same time that the temperature is being increased, the naphtha feed rate to the reactor is gradually increased from a space velocity of about 1 v./v./hr. to a space velocity of at least 2 v./v./hr. Generally, in a commercial reforming unit the temperature of the catalyst in the reactor cannot be raised from 650° F. to about 900° F. in less than 2 hours because of limitations in the capacity of the furnace to heat the feed and the recycling gases. A longer period of time than 3 hours is not generally necessary in order to bring the catalyst to normal reforming temperature while still preventing a temperature runaway.

When the naphtha is contacted with the platinum-rhenium catalyst at a pressure of about 200 p.s.i.g. and a catalyst temperature of about 650° F., a limited amount of hydrogen is produced from, e.g., the dehydrogenation of naphthenes. The naphtha and inert gas, along with any produced hydrogen, are removed from the reactor and passed to a gas separation zone. There the inert gas and any hydrogen that was produced by reforming of the naphtha are separated from the naphtha; the inert gas and hydrogen are recycled to the reactor. Over the period of time, i.e., during the 2 to 3 hour period, at which the catalyst temperature is increased from 650° F. to 900° F., and the space velocity of the feed contacting the catalyst is increased, hydrogen is produced in increasingly greater amounts. Recirculating produced hydrogen to the treating zone results in a gradual increase in the hydrogen partial pressure. Part of the recycle gas, i.e., inert gas, and hydrogen, and any light hydrocarbon gases such as methane present in the recycle gas, is continuously discharged from the system to gradually remove substantially all the inert gas. The rate of discharge is not permitted to exceed the rate at which hydrogen is produced. Hence, the pressure in the reactor remains at least 200 p.s.i.g. If desired the pressure can be increased considerably above 200 p.s.i.g., e.g., to 300 p.s.i.g. or higher, by the build up of autogenous pressure of produced hydrogen. The discharge of gaseous material from the system is continued at least until the hydrogen concentration is sufficient for use in the desired reforming operation. The inert gas concentration in the recycle stream and in the reactor should be decreased to less than 10 volume percent and preferably less than a 5 volume percent of the total recycle stream. This buildup of pressure of produced hydrogen occurs within the period of 2 to 3 hours during which the catalyst temperature is increased from 650° F. to 900° F.

Figure 1:
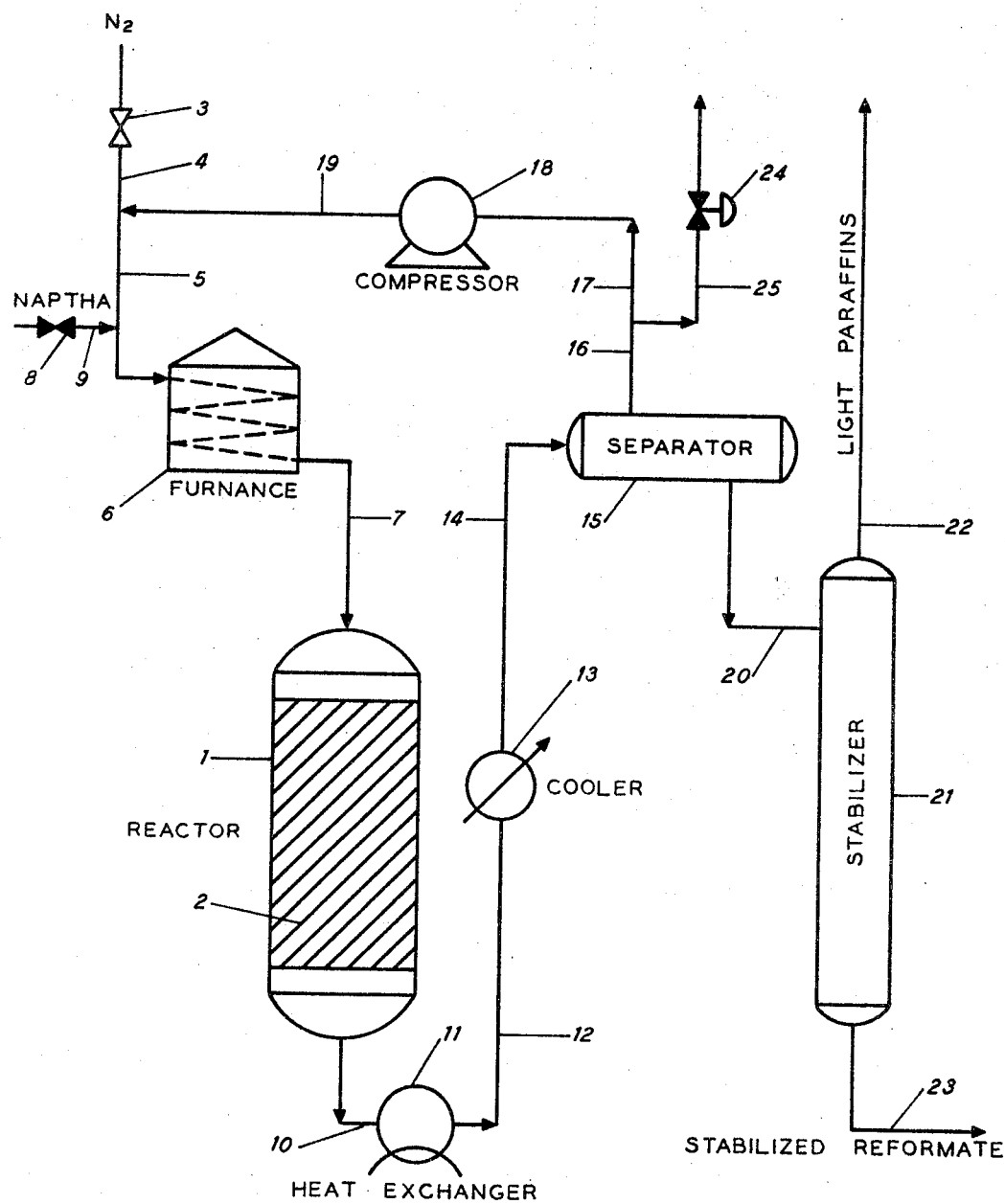
FIGURE 1 is a simplified diagram of a typical reforming system. The present process for startup of a reforming process using a platinum-rhenium catalyst will be more fully described by reference to the reforming system of FIGURE 1.

In order to provide a better understanding of the present invention, reference will now be made to the accompanying FIGURE 1 which contains a simplified diagram of a typical reforming unit.

A suitable reforming reactor 1 is filled with a platinum-rhenium catalyst 2. An inert gas, in this case nitrogen, is passed through open valve 3, through lines 4 and 5 into the furnace 6. The nitrogen is heated in furnace 6 to an elevated temperature and passed through line 7 to reactor 1 into contact with the bed of catalyst 2. Valve 8, through which naphtha feed will enter into line 9, thence to the furnace 6 and reactor 1, is closed. Nitrogen is withdrawn from reactor 1 through line 10 for recirculation to the reactor. The nitrogen withdrawn through line 10 passes through heat exchanger 11 through line 12 to a cooler 13. Thereafter nitrogen passes through line 14 to gas liquid separator 15, through line 16, line 17, compressor 18 and line 19 to line 5 where the recycled nitrogen mixes with nitrogen introduced through line 4. The reforming system is pressured to about 200 p.s.i.g. with nitrogen, and the catalyst temperature raised to about 650° F. by circulating nitrogen heated in furnace 6 through the catalyst bed 2. Thereafter, valve 3 is closed, and valve 8 opened to permit naphtha into line 9 and thence into line 5 and into furnace 6. The naphtha passes through line 7 into contact with the bed of platinum-rhenium catalyst 2 at a space velocity of about 1 v./v./hr. At the low temperature of 650° F. and in the presence of nitrogen very little reforming of the naphtha occurs. A small amount of dehydrogenation of the naphthenes does occur with the accompanying production of hydrogen. The mixture of nitrogen and naphtha and any produced hydrogen is withdrawn from reactor 1 through line 10 into heat exchanger 11. In the heat exchanger 11, the nitrogen-naphtha mixture generally passes in indirect contact with a fresh naphtha (not shown); the heated fresh naphtha stream is then sent through line 9 and line 5 to furnace 6. The nitrogen-naphtha mixture next passes from heat exchanger 11 through line 12, cooler 13, line 14 into separator 15. The nitrogen and any produced hydrogen are separated from the naphtha in separator 15; the naphtha is removed through line 20 and passed to stabilizer 21. It may be desirable during the initial stages of contact of the naphtha with the catalyst, that is, during the period of time that little or no reforming of the naphtha occurs, to recycle naphtha from separator 15 to furnace 6 and to reactor 1 for further reforming. Means for recycling naphtha are not shown in the figure. After the reforming process is on stream any reformate removed from separator 15 is sent to stabilizer 21, the light paraffins being removed through line 22 and the stabilized reformate removed through line 23. The nitrogen and hydrogen removed from separator 15 pass through line 16, line 17, into compressor 18. The compressed gases are then recycled to furnace 6 through lines 19 and 5.

The catalyst temperature in reactor 1 is gradually increased from about 650° F. to about 900° F. over a period of 2 to 3 hours. The naphtha feed rate is gradually increased from about 1 v./v./hr. to at least 2 v./v./hr. over the same period. As the temperature is gradually increased, hydrogen is produced in greater amounts; hydrogen withdrawn from reactor 1 is recycled to the reactor. The nitrogen concentration in the recycle gases is gradually decreased over a period of about 2 to 3 hours by bleeding off or discharging part of the recycle stream from the reforming system through line 25 by opening valve 24. The rate at which the gases are withdrawn is not permitted to exceed the rate at which hydrogen is produced. The hydrogen pressure is allowed to build up over a period of 2 to 3 hours while maintaining a total pressure in the reaction zone of at least 200 p.s.i.g. Normally, at the end of the 2 to 3 hour period of bringing the catalyst temperature and reactor pressure to the desired level for reforming, substantially all the nitrogen should have been discharged from the system and reforming of the naphtha in the presence of hydrogen should be occurring.

By means of the startup procedure described by reference to FIGURE 1, a temperature excursion in the catalyst bed will have been substantially eliminated.

The naphtha to be employed in the process of the present invention is a light hydrocarbon oil. Generally the naphtha will boil in the range from about 70° F. to about 500° F., preferably from 150° F. to 450° F. The feedstock can be, for example, either a straight run naphtha or a catalytically cracked naphtha or blends thereof. The feed is preferably essentially sulfur-free, i.e., the feed preferably contains less than about 10 p.p.m. sulfur and more preferably less than 1 p.p.m. and still more preferably less than 0.1 p.p.m.

In the case of a feedstock which is not already low in sulfur, acceptable levels can be reached by hydrogenating the feedstock in a presaturation zone, e.g., a hydrodesulfurization zone, where the naphtha is contacted with a hydrogenation catalyst which is resistant to sulfur poisoning. A suitable catalyst for this hydrodesulfurization process is, for example, an alumina-containing support and a minor proportion of molybdenum oxide and cobalt oxide. Hydrodesulfurization is ordinarily conducted at 700 to 850° F., at 200 to 2000 p.s.i.g., and at a liquid hourly space velocity (LHSV) of 1 to 5. The sulfur contained in the naphtha is converted to hydrogen sulfide which can be removed prior to reforming by suitable conventional processes.

In a reforming process to convert a naphtha to high octane gasoline using the present invention as a startup procedure, the reforming conditions for converting the naphtha to high octane gasoline can be varied over wide ranges depending on, among others, the feed used, and the desired octane rating of the product. The temperature in the reforming operation will generally be within the range of about 600° to 1100° F. and preferably about 700° to 1050° F. The pressure in the reforming reaction zone can be superatmospheric, atmospheric or subatmospheric; however, the pressure will generally lie within the range from about 25 to 1000 p.s.i.g., preferably from about 50 to 750 p.s.i.g. The temperature and pressure can be correlated with the liquid hourly space velocity to favor any particularly desirable reforming reaction, as for example, aromatization, isomerization or dehydrogenation. In general the LHSV will be from 0.1 to 10, preferably from 1 to 5. The hydrogen to hydrocarbon mole ratio is preferably from about 0.5 to 20. During the reforming process the hydrogen can be in admixture with light gaseous hydrocarbons.

The process of the present invention can be better understood by reference to the following examples.

Example 1

A catalyst comprising about 0.6 weight percent platinum and about 0.6 weight percent rhenium associated with alumina was used for reforming a hydrofined catalytically cracked naphtha having an initial boiling point of 151° F. an end boiling point of 420° F. and a 50 percent boiling point of 307° F. The research octane number of the naphtha without antiknock additives (F–1 clear) was 64.6. The naphtha contained less than 0.1 p.p.m. sulfur. The reforming process was started up in the presence of nitrogen in accordance with the present process. That is, after placing the catalyst in a reactor, and following reduction, nitrogen was circulated through the reforming system, including the reactor, to pressurize the reforming system to about 200 p.s.i.g. The catalyst was also heated to a temperature of about 650° F. Thereafter the hydrofined catalytically cracked naphtha was contacted with the catalyst in the reactor at a space rate of about 1 v./v./hr. A naphtha-nitrogen mixture containing any produced hydrogen was withdrawn from the reactor, and passed to a gas separation zone wherein nitrogen was separated from the naphtha. The nitrogen was recycled to the reaction zone. The temperature of the catalyst in the reactor was raised from about 650° F. to about 900° F.–910° F. at a generally uniform rate over a period of about 2 to 3 hours. The naphtha feed rate was increased over the same period from about 1 v./v./hr. to at least 2 v./v./hr. Hydrogen produced by the reforming of the naphtha was recycled to the reaction zone. The pressure in the reaction zone was gradually increased by buildup of autogenous pressure of produced hydrogen over a period of 2 to 3 hours until a level of about 300 p.s.i.g. was reached. The nitrogen in the recycling gas was decreased as hydrogen was produced by discharging part of the recycle gas from the reforming system. The reforming process was then conducted at a space velocity of at least 2 v./v./hr., a pressure of 300 p.s.i.g. and a hydrogen to hydrocarbon mole ratio of 4. A gasoline product having a 100 F.–1 clear octane rating was produced.

No temperature excursion was observed using the startup process of the present invention. Generally, when a naphtha is introduced to a catalytic reaction zone containing a supported platinum-rhenium catalyst at reforming conditions without a careful startup to reduce the hydrocracking activity of the catalyst, a temperature excursion or heat front travels through the catalyst bed. The temperature in the bed may increase as high as several hundred degrees above the temperature of the naphtha introduced to the reaction zone. Such a severe temperature increase can damage the reactor and/or catalyst. The startup procedure of the present invention eliminates or substantially reduces this heat front.

For comparison purposes a reforming process using a catalyst comprising 0.6 weight percent platinum and 0.6 weight percent rhenium supported on alumina was started up in the presence of sulfur. That is, a hydrofined catalytically cracked naphtha (described above for the startup process using nitrogen) was contacted directly with a presulfided catalyst, the catalyst having been presulfided in situ prior to contact with naphtha by circulating $H_2S$ and hydrogen through the catalyst bed at an elevated temperature of about 700° F. The presulfiding was accomplished using greater than 3 atomic ratio of sulfur to platinum plus rhenium. The naphtha was contacted with the presulfided catalyst in the presence of hydrogen at a catalyst temperature of about 650° F. and a pressure of about 200 p.s.i.g. Thereafter the temperature of the catalyst and pressure of the reforming system were gradually increased over about a 2 to 3 hour period to the temperature and pressure necessary to produce 100 F-1 clear octane gasoline. The feed was contacted initially with the catalyst at a space rate of about 1 v./v./hr., but was increased to at least 2 v./v./hr. over the period of time during which the temperature and pressure were being increased. The conditions used in the reforming process using the presulfided catalyst included a pressure of 300 p.s.i.g., a space velocity at least 2 v./v./hr., and a hydrogen to hydrocarbon mole ratio of 4. A 100 F-1 clear octane product was produced throughout the run.

FIGURE 2 is a graph of the average catalyst temperatures necessary to produce 100 F-1 clear octane gasoline for the reforming processes started up by the different procedures. The average catalyst temperatures are shown as a function of on stream times. Curve 1 shows the average catalyst temperatures required to produce 100 F-1 clear product in the reforming process using the catalyst presulfiding startup procedure. Curve 2 shows the average catalyst temperatures necessary to produce 100 F-1 clear octane product in a reforming process started up by the procedure of the present invention. The temperatures required to maintain a 100 F-1 clear octane product is significantly lower for the process using the startup method of the present invention than for the reforming process using a conventional sulfur startup. An initial activity increase of about 12 degrees is observed during the reforming process using the startup of the present invention as compared to the reforming process using the conventional sulfur startup. Furthermore, the reforming process using the startup process of the present invention has a lower fouling rate (the temperature increase necessary to maintain the 100 F-1 clear product) than the process using the conventional sulfur startup.

The curves in FIGURE 3 show the $C_5+$ liquid product yield, measured as volume percent of the total product, as a function of on-stream time. Curve 1 is for the reforming process started up by means of the catalyst presulfiding method. Curve 2 is for the reforming process started up by means of the present invention. The reforming process using the nitrogen startup in accordance with the present invention (curve 2) shows a significantly improved yield stability as compared to the reforming process using the catalyst presulfiding startup (curve 1). The yield of $C_5+$ product produced during the reforming process started up in accordance with the present invention does not significantly decrease until after about 350 hours. On the other hand, the yield of $C_5+$ product produced during the reforming process started up conventionally by presulfiding begins to decrease significantly after only 200 hours.

Example 2

A reforming process using a catalyst comprising about 0.6 weight percent platinum and about 0.6 weight percent rhenium associated with alumina was started up in the presence of argon in accordance with the present invention. The reactor containing a bed of reduced platinum-rhenium catalyst was pressured to about 200 p.s.i.g. with argon and the catalyst heated to a temperature of about 650° F. Thereafter a catalytically cracked sulfur-free naphtha having an initial boiling point of 151° F. and an end boiling point of 420° F. (further described in Example 1) was contacted with the catalyst in the reactor at a space rate of 1 v./v./hr. Naphtha and argon were withdrawn from the reactor, separated in a gas separation zone and the argon recycled to the reactor. The temperature of the catalyst was raised from about 650° F. to about 900° F. at a generally uniform rate over a period of about 2 to 3 hours. The naphtha feed rate was increased over the same 2–3 hour period from about 1 v./v./hr. to at least 2 v./v./hr. The pressure in the reaction zone was increased by the buildup of produced hydrogen until a level of about 300 p.s.i.g. was reached. Argon was gradually purged from the system as hydrogen was produced.

The reforming process was conducted at a space velocity of at least 2 v./v./hr. and a pressure of 300 p.s.i.g. and a hydrogen to hydrocarbon mole ratio of 4. A gasoline product having a 100 F-1 clear octane rating was produced A temperature spike or heat excursion was not observed in the catalyst bed when using argon in the startup procedure of the present invention. It was possible to bring the reactor on stream, i.e., to normal reforming conditions as smoothly as when nitrogen was used as the inert gas in the startup process.

The reforming process started up in the presence of argon exhibited yields and fouling rate over the on stream period comparable to the reforming process started up in the presence of nitrogen. The reforming process started up in the presence of argon showed a better overall performance, i.e., high activity and lower fouling rate as well as better yield stability than a reforming process started up by the conventional process of presulfiding the catalyst.

We claim:

1. A method for startup of a reforming process using a reforming catalyst comprising a porous solid carrier having platinum and rhenium associated therewith in a reduced state, which comprises introducing said catalyst into a reaction zone, pressuring said reaction zone with an inert gas to about 200 p.s.i.g., heating said catalyst to about 650° F., contacting said catalyst with a substantially sulfur-free naphtha at a space rate of about one volume of naphtha per volume of catalyst per hour, withdrawing a mixture of naphtha and inert gas from said reaction zone and passing said mixture into a gas-separation zone to separate inert gas from naphtha, withdrawing naphtha from said separation zone and recycling inert gas to said treating zone, raising the temperature of said catalyst in said treating zone from about 650° F. to about 900° F. at a generally uniform rate over a period of about 2 to 3 hours, gradually increasing the naphtha feed rate to said reaction zone at a generally uniform rate over a period of 2 to 3 hours until a space velocity of at least 2 volumes of naphtha per volume of catalyst per hour is reached, and gradually decreasing the flow of inert gas into said reaction zone while building up autogenous pressure of produced hydrogen over a period of 2 to 3 hours to maintain a pressure in said reaction zone of at least about 200 p.s.i.g.

2. The process of claim 1 wherein said inert gas is nitrogen.

3. The process of claim 1 wherein said catalyst comprises 0.01 to 3 weight percent platinum and 0.01 to 5 weight percent rhenium.

References Cited

UNITED STATES PATENTS

| | | | |
|---|---|---|---|
| 2,880,161 | 3/1959 | Moore et al. | 208—65 |
| 2,902,434 | 9/1959 | Burton et al. | 208—134 |
| 3,000,809 | 9/1961 | Ridgway et al. | 208—65 |
| 3,296,118 | 1/1967 | Czajkowski et al. | 208—138 |
| 3,309,306 | 3/1967 | MacLaren | 208—138 |

HERBERT LEVINE, *Primary Examiner.*

U.S. Cl. X.R.

208—139; 252—461, 466